United States Patent [19]

Spinelli et al.

[11] Patent Number: 4,728,994
[45] Date of Patent: Mar. 1, 1988

[54] ILLUMINATION SYSTEM UTILIZING A DOCUMENT PLATEN WITH A DIFFUSELY REFLECTING SURFACE

[75] Inventors: Richard A. Spinelli, Rochester; Edward A. Powers, Penfield; John A. Durbin, Webster, all of N.Y.

[73] Assignee: Xerox Corporation, Stamford, Conn.

[21] Appl. No.: 919,952

[22] Filed: Oct. 17, 1986

[51] Int. Cl.⁴ ............................................. G03B 27/72
[52] U.S. Cl. ...................................... 355/71; 355/113; 355/52; 355/75
[58] Field of Search ...................... 355/71, 67, 113, 80, 355/52, 75, 76

[56] References Cited

U.S. PATENT DOCUMENTS

| | | | |
|---|---|---|---|
| 3,697,177 | 10/1972 | Booth | 355/11 |
| 3,957,370 | 5/1976 | Vola | 355/75 |
| 4,194,831 | 3/1980 | Hartwig et al. | 355/67 |
| 4,194,835 | 3/1980 | Shiode | 355/67 |
| 4,466,734 | 10/1984 | Rees | 355/58 |
| 4,533,979 | 8/1985 | Rees et al. | 355/67 |

Primary Examiner—Monroe H. Hayes

[57] ABSTRACT

An illumination housing includes a glass platen for supporting a document, the platen having at least one surface area uniformly roughened. In one embodiment, both surfaces are uniformly roughened by an etching process. The surface of the platen are thus rendered diffusely reflective to specular hot or cold light spots formed by light reflected from optical components within the illumination system and compensates for platen-derived specular reflections into the projection lens.

3 Claims, 3 Drawing Figures

ILLUMINATION SYSTEM UTILIZING A DOCUMENT PLATEN WITH A DIFFUSELY REFLECTING SURFACE

The present invention relates to an optical illumination system for an electrophotographic reproduction machine and, more particularly, to an illumination system including a platen modified to prevent specular light reflections from the platen.

High-speed copiers and duplicators are known in the art which utilize full-frame illumination systems to provide uniform illumination of a document placed on a transparent glass platen. Examples of such machines are the Xerox 9200 copier/duplicator and the Xerox 1075 copier. Full-frame, flash illumination systems are also described, for example, in U.S. Pat. Nos. 3,697,177 and 4,466,734. These prior art systems typically include a light housing having therein one or more flash lamps. The housing floor seats a projection lens while the top of the housing accommodates a transparent glass platen for supporting the document to be copied. To aid in obtaining a uniform illumination of the document, and to increase the document illumination, the interior walls of the housing are coated with a diffusely reflective material. Thus, when the flash lamps are energized, the emitted light undergoes multiple reflections from the diffusely reflective interior walls and is incident at a generally uniform level along the platen surface. A document, placed on the top surface of the platen, is ideally illuminated at the average brightness of the housing; the housing operating as an integrating cavity for the light dispersion.

One of the problems of the prior art flash illumination systems is that hot or cold light spots are formed by the flash lamp or other components mounted interior to the housing (such as specular reflectors). These spots, which are different in average reflectivity from the housing walls, are specularly reflected from the bottom and top surfaces of the platen and, if not compensated for in some manner, are reflected into the lens pupil and projected onto the surface of the photoreceptor. Latent images of the document, when developed, contain degraded image areas caused by non-uniform stray light and are thus objectionable. This problem may also be encountered, in less severe form, in optical illumination systems which scan a document with a moving lamp/mirror assembly located beneath the platen.

The most common method for compensating for these unwanted reflections is to coat one or both surfaces of the platen glass with an antireflection coating such as $MgF_2$. This coating reduces the stray specular reflections. While effective, this method is also costly because of the expense of the material, the manufacturing process and because of the propensity of the top layer to abrade.

The present invention is therefore directed to a simple inexpensive method and apparatus for preventing unwanted, non-uniform stray light reflections in a document illumination system. More particularly, the invention relates to a document illumination system comprising, in combination, a transparent platen positioned in an object plane for supporting a document to be reproduced; illumination means positioned beneath said object plane for illuminating a document on said platen; said platen characterized by having at least one uniformly irregular area on at least one surface for minimizing specular reflection by diffusing light reflected therefrom and diffused therethrough.

It is known in the art to use diffuse surfaces for their lightscattering properties. For example, U.S. Pat. No. 3,697,177 discloses a light chamber with a diffusely reflective interior to enhance the light-integrating effect of the chamber. U.S. Pat. No. 4,194,835 discloses an exposure device having a lamp partially surrounded by a reflector provided with raised ribs. The purpose of the ribs is to reflect the light emanating from the lamp in a different pattern to achieve more uniform exposure. These references do not disclose a platen which has at least one area modified to produce a diffuse light-dispersing effect.

DESCRIPTION

Figure 1:
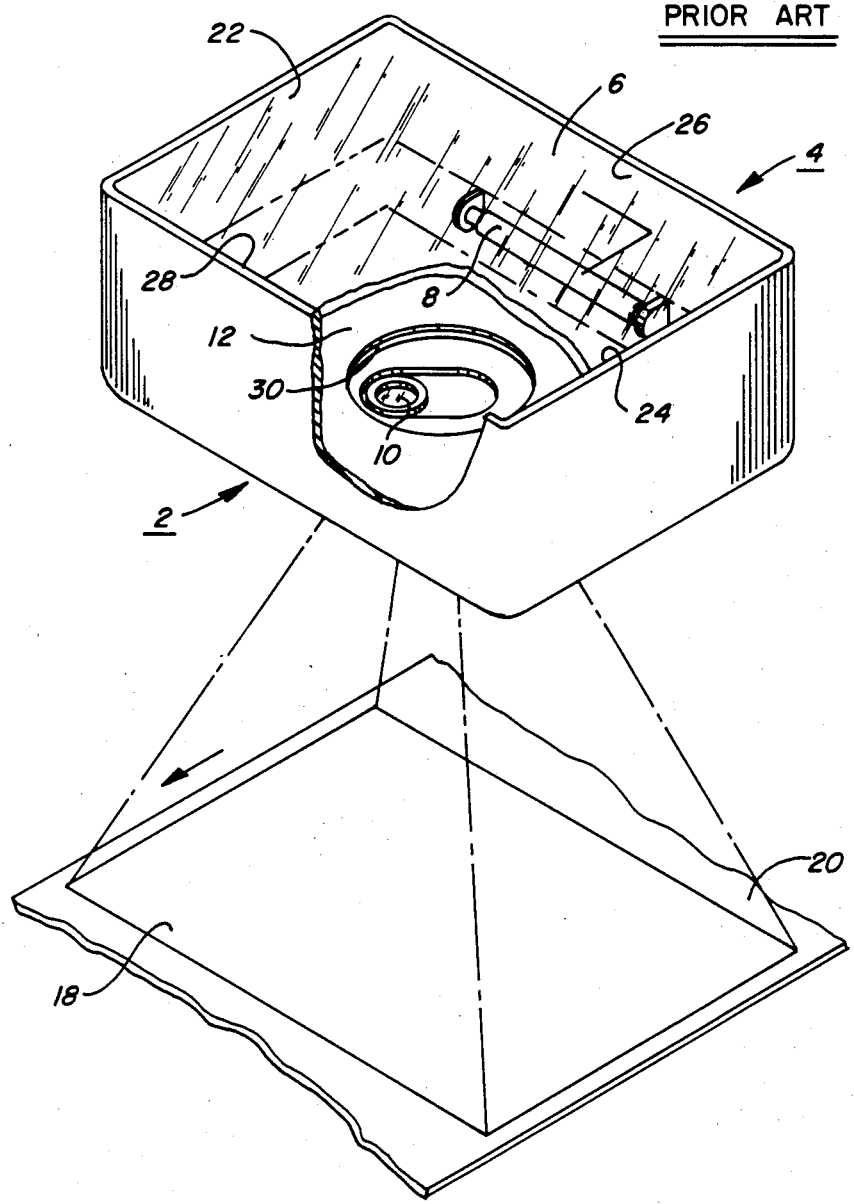
FIG. 1 is a perspective view of a prior art illumination and imaging system utilizing a conventional glass platen.

Referring now to FIG. 1, there is shown a prior art document illumination and imaging system. The system 2 generally comprises a light housing 4, the top surface of which is defined by a transparent platen 6 upon which a document (not shown) is placed. Within housing 4 is a flash lamp 8 connected to a suitable source of power (not shown). Lens 10 is mounted within floor 12 of the housing. During a copying mode, lamp 8 is pulsed and the underside of the document is uniformly illuminated. The document image passes through lens 10 and discharges the previously charged surface of a photoreceptor belt 20 forming a latent electrostatic image of the document on the belt surface.

Housing 4 comprises lower left, right, back and front walls 20, 22, 24 and 26 respectively. Lens 10 is seated in an aperture 28 formed in housing floor 12. All the interior surfaces of the housing 4 are coated with a high reflectivity material thereby making these surfaces diffusely reflective to light impinging thereon. When lamp 8 is pulsed and caused to flash, light is directed against these coated surfaces, undergoing one or more reflections and irradiating the underside of the document with a generally uniform level of illumination. The housing thus efficiently functions as a lightintegrating cavity which provides a generally uniform illumination level along the bottom of the object plane. However, there is present to some degree various areas of uneven illumination at the platen surface (hot and cold light spots) which are separately specularly reflected into the lens creating a degraded image at the photoreceptor surface. These platenderived specular reflections can be reduced, as known in the prior art, by coating one or both surfaces of platen 6 with an anti-reflection material such as $MgF_2$. In another method, disclosed in U.S. Pat. No. 4,533,979, various illumination techniques are described for improving the degraded images formed at the photoreceptor.

Figure 2:
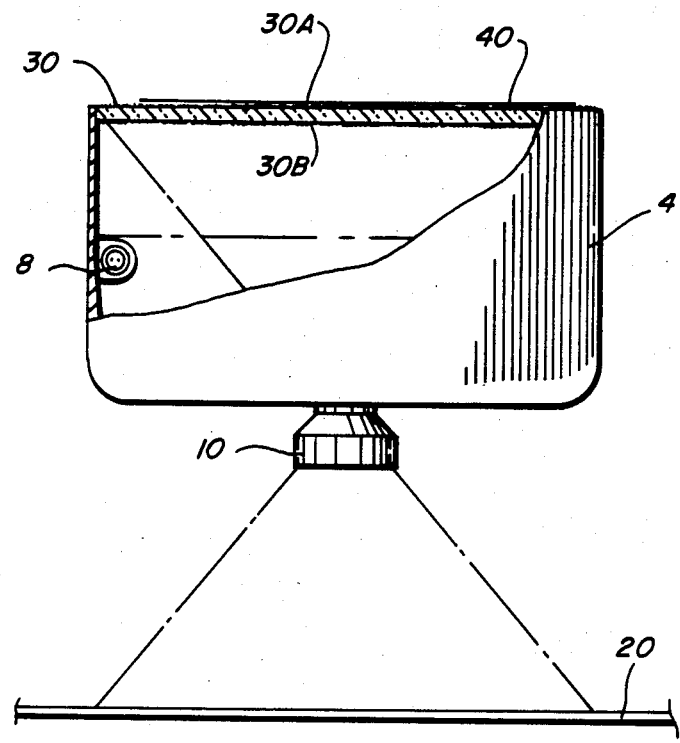
FIG. 2 shows a partial view of the light housing of FIG. 1, modified to include the platen of the present invention having etched surfaces to diffusely reflect light transmitted therethrough.

FIG. 2 shows a portion of housing 4 having a platen 30 modified, according to the invention, by rendering the surface diffuse. The platen is shown with a document 40 on the top surface thereof. In the FIG. 2 embodiment, both sides 30A and 30B of platen 30 have been finely etched to produce a slightly diffuse surface.

Figure 3:
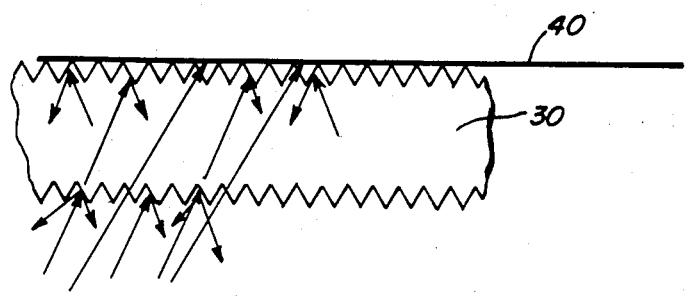
FIG. 3 shows an enlarged view of a portion of the platen surface of FIG. 2.

FIG. 3 shows an enlarged area of a portion of the platen with the etched groove depth greatly exaggerated. The slightly diffused character of the surface reduces unwanted specular reflections from the platen surface and introduces a uniform, low-level amount of stray light that can be compensated for at the photoreceptor. Although two areas R and S are shown as scattering the light, it is understood that both surfaces are scattering light in the same manner.

Platen 30, in a preferred embodiment, is made of a standard soda lime float glass. Both surfaces are etched in an acid solultion to an average RMS surface roughness of 0.19 microns. The difference between the adjacent peaks and valleys in the surface roughness profile is random, but would approximate 28–45 peaks per mm of linear surface which corresponds to an autocorrelation length of 0.022 mm to 0.035 mm.

It has been found that etching of one surface alone (preferably the top surface) is satisfactory for most systems. The invention may also be practised in a modified from by etching only selected areas on one or both of the platen surfaces, the selectively etched areas being associated with reduction of uneven areas of illumination of the document. The areas to be etched may be left unmasked during the acid solution etching step. As a further extension of this technique, each separately etched area may have its own parameters; e. g. different RMS surface roughness and autocorrelation length, to provide a unique diffusion pattern.

While a fine etch is a preferred method of obtaining the required diffusion pattern at the platen surface, (since it does not interfere with cleaning or document belt operation) other methods may be used. For example, a uniform light grinding or sand-blasting technique may be employed.

The particular method used must be consistent with maintaining the required transmittance characteristics for the particular system.

While the above description and the drawings have described the invention in the contact of a flash-illumination system, the invention may also be used in a document illumination system wherein a document is incrementally scanned by a lamp/mirror assembly moving beneath the platen in a scan mode. These systems are not ordinarily subject to specular reflection problems since the lamps are positioned to avoid specular reflection from the platen to the lens. However, some systems may require the illumination lamps to be mounted in relatively close proximity to each other creating unwanted specular reflections. For this case, one or more diffusely reflective surfaces may be desirable.

What is claimed is:

1. A document flash illumination system comprising, in combination:
   a transparent platen positioned in an object plane for supporting a document;
   illumination means positioned in a light housing located beneath said object plane for directing illumination towards said document;
   said platen characterized by having at least one uniformly irregular surface for uniformly diffusing light reflected from or transmitted therethrough.

2. A document illumination system according to claim 1 wherein said uniformly irregular surface has an average RMS surface roughness of 0.19 micron.

3. A flash illumination and imaging system for a copier comprising, in combination:
   a platen member for supporting original documents to be copied;
   an enclosed illumination housing positioned beneath said platen member, said housing having generally diffusely reflective interior surface;
   a flash illumination means within said housing adapted for periodically providing flash illumination at said platen surface;
   a lens mounted in the floor of said housing for projecting document images onto a photosensitive image plane;
   said platen having a plurality of uniformly irregular surface areas with at least one area differing in average RMS roughness from the other.

* * * * *